March 31, 1953 S. I. TOURSHOU 2,633,538

BEAM DEFLECTION CONTROL

Filed Oct. 31, 1947 4 Sheets-Sheet 1

INVENTOR
SIMEON I. TOURSHOU
BY
ATTORNEY

INVENTOR
SIMEON I. TOURSHOU
BY [signature]
ATTORNEY

March 31, 1953 S. I. TOURSHOU 2,633,538

BEAM DEFLECTION CONTROL

Filed Oct. 31, 1947 4 Sheets-Sheet 3

INVENTOR
SIMEON I. TOURSHOU
BY [signature]
ATTORNEY

March 31, 1953 S. I. TOURSHOU 2,633,538

BEAM DEFLECTION CONTROL

Filed Oct. 31, 1947 4 Sheets-Sheet 4

INVENTOR
SIMEON I. TOURSHOU
BY [signature]
ATTORNEY

Patented Mar. 31, 1953 2,633,538

UNITED STATES PATENT OFFICE 2,633,538

BEAM DEFLECTION CONTROL

Simeon I. Tourshou, Philadelphia, Pa., assignor to Radio Corporation of America, a corporation of Delaware Application October 31, 1947, Serial No. 783,303

13 Claims. (Cl. 250—36)

The present invention relates to means for producing deflection of a cathode ray beam and more particularly, but not necessarily exclusively, to novel and improved means for producing and controlling the scanning deflection of a cathode ray beam. In accordance with the invention the improved means referred to includes an oscillator which not only provides a deflecting voltage of suitable wave form but also provides a signal which is utilized in the functioning of a control tube. Immunity to interference from spurious signals and noise is an important feature of this invention.

The invention finds primary application in connection with television apparatus where a cathode ray beam must be swept over the target area in a cathode ray tube in synchronism with similar means at a more or less remote transmitter to provide an undistorted image to be viewed at the receiving point. In accordance with the invention in a preferred form a free running oscillator is controlled by a voltage varying in accordance with the difference in phase between the generated oscillations and a transmitted signal which is indicative of timed operation of a signal source such as a video camera. In one embodiment of the invention selected for purposes of illustration the output of the oscillator, for example, is of a sawtooth wave form. In the preferred embodiment the wave form of the oscillator is modified and additional components are added as will be fully set forth hereinafter. In each embodiment of the invention, the derived control voltage regulates the frequency of operation of the oscillator automatically. Novel arrangements are provided for controlling or setting the free running speed or fundamental frequency of the oscillator.

Accordingly one object of the invention is to provide a novel system for synchronizing television or oscillographic apparatus which will have a high degree of immunity to spurious signals and noise impulses.

Another object is to provide novel means for controlling the oscillating rate of an oscillator.

A further object is to provide novel means for deriving a signal of irregular wave form.

A still further object is to provide a novel arrangement for diminishing the effect of noise impulses on a system operating with automatic frequency control characteristics.

A still further object is to provide a novel AFC (automatic frequency control) system for a television receiver which is directly available for producing either the slow speed or high speed component of scanning deflection in a cathode ray tube.

Other objects and advantages of the present invention will, of course, become apparent and immediately suggest themselves to those skilled in the art to which the invention is directed from a reading of the following specification in connection with the accompanying drawings in which.

Figure 1:
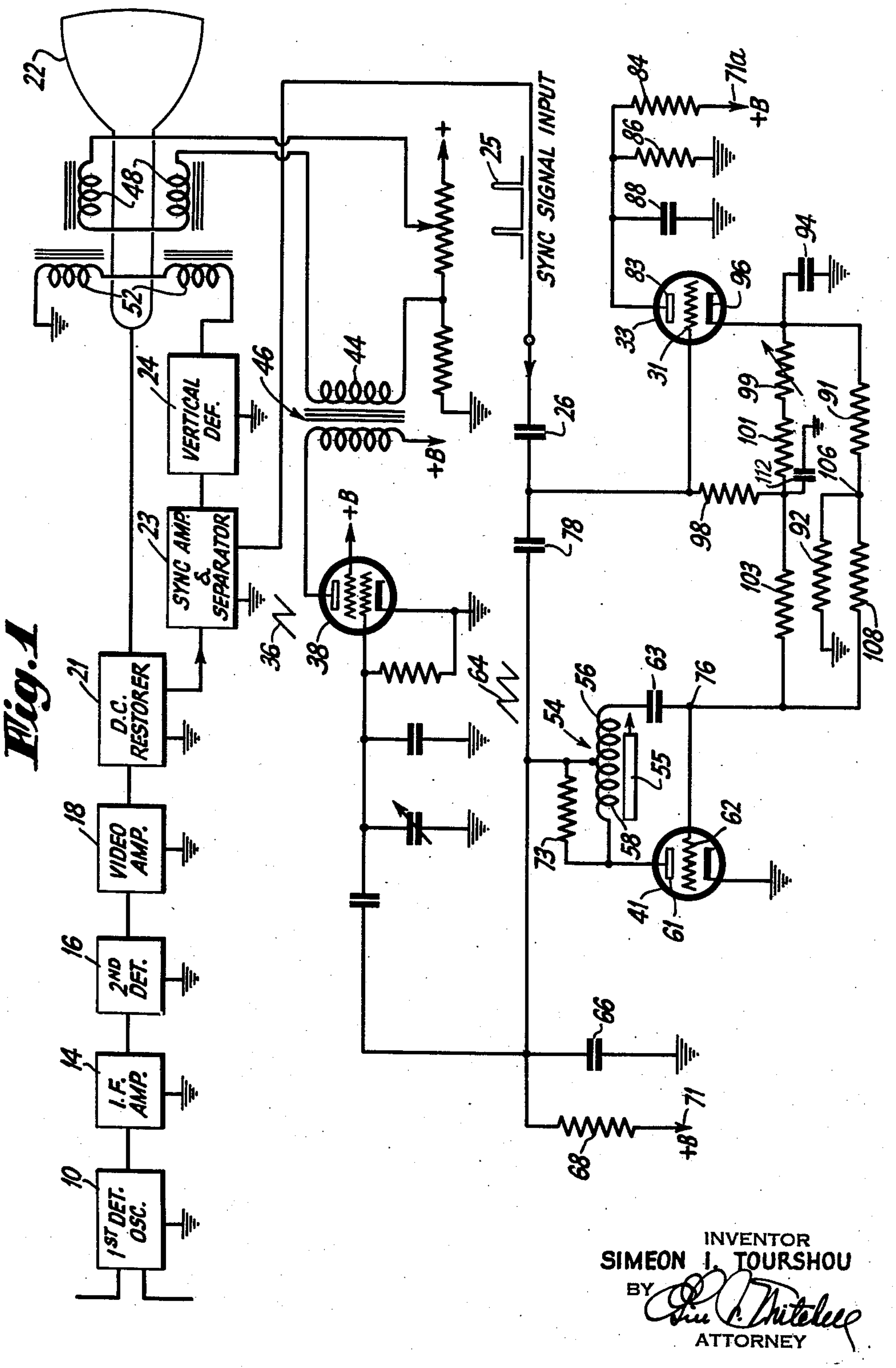
Figure 1 is a schematic disclosure of the circuits of a portion of a television receiver embodying the present invention.
Figure 5:
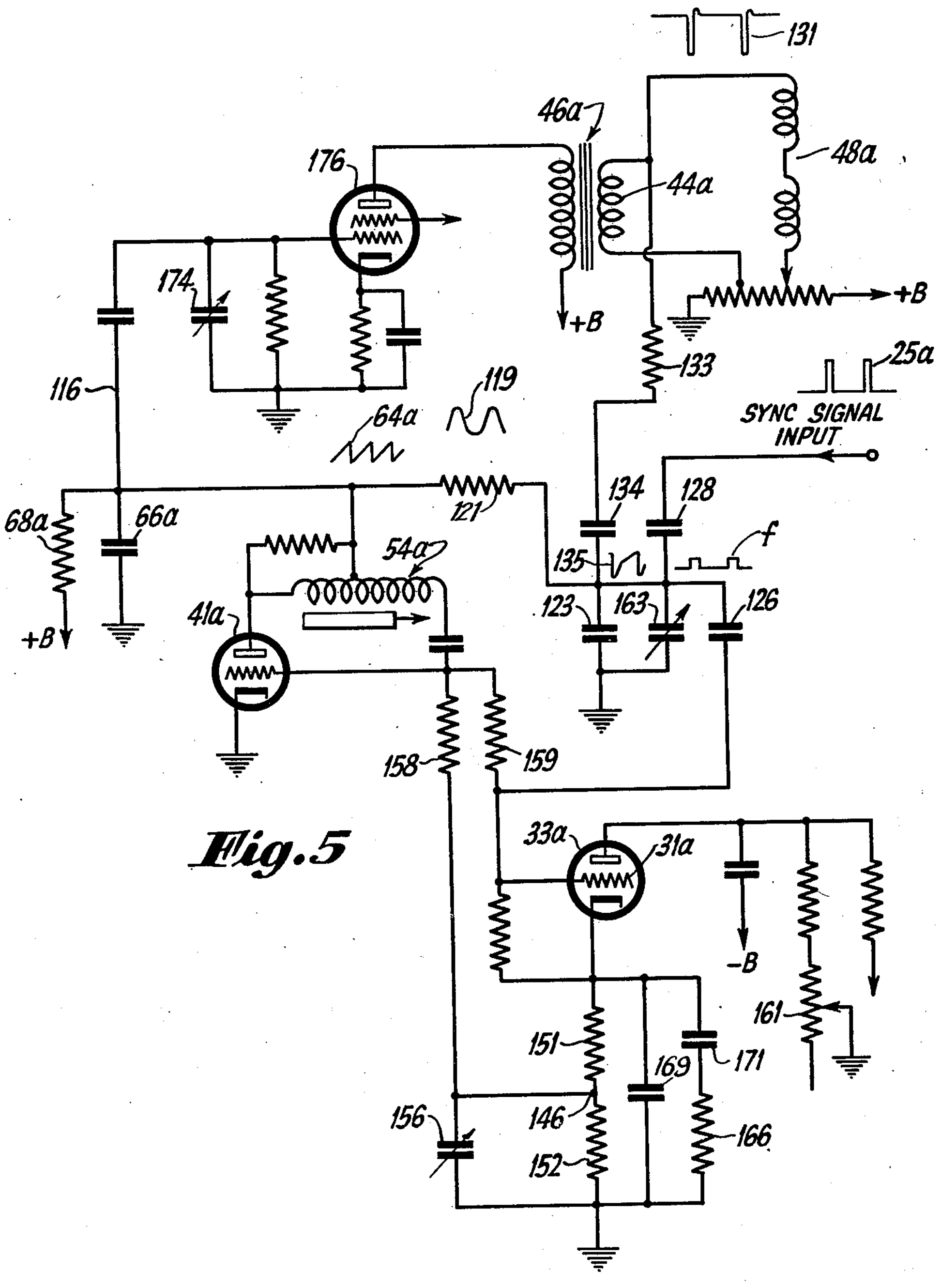
Figure 5 is a schematic disclosure of the circuits of a portion of a television receiver embodying the invention in a modified preferred form.

The general arrangement of Figures 1 and 5 is similar insofar as they show the principal units of a system embodying the invention. The invention as disclosed and as it will be described for the present, in connection with Figure 1 of the drawings, comprises essentially the combination of an oscillator and a single multi-purpose tube which may be aptly referred to as a "control tube." The oscillator is controlled, in accordance with the invention, by the development of a direct current bias. This bias is derived from a combined signal and includes pulses having an energy content depending upon the existing phase or relationship between a timed impulse or a series of such timed impulses and a locally generated or derived signal. In the embodiment of Figure 1 the pulses are the customary sync pulses which are produced or derived as the result of demodulation of a received television signal. In the illustrative form of the invention now being described, control of the high frequency or line deflection traces of a cathode ray beam in an image producing tube is shown but it will be understood that the invention is readily adapted for the control of the lower frequency or vertical deflection traces.

Figure 1 shows a portion of a television receiver of the superheterodyne type comprising the usual first detector 10, which incorporates a tunable oscillator, an intermediate frequency amplifier 14 and a second detector or demodulator 16. The output of the second detector 16 is furnished to the video amplifier 18 and a D. C. level setting device or D. C. restorer 21 to control the image producing tube 22 in such a way that the cathode ray beam produces an intensity modulated pattern or raster on the tube target. This recreates the original image light values.

The detached signals are also supplied to a sync amplifier and separator 23 to select between the video and synthesizing signals. Since the invention is illustrated in connection with a horizontal (or line) deflection control, it will be assumed that the vertical (field or frame) deflection signals are then suitably selected to control the slow speed cathode ray beam deflection through any known form of vertical deflection control 24, such as the oscillator and output tube arrangement described by Tolson et al. in United States Patent No. 2,101,520 granted December 7, 1937. The other components so far explained and mentioned are well known in general and require no further explanation. However, solely for the sake of completeness of the disclosure and in order to provide an explanation of the setting of the invention for those desiring a detailed explanation of the operation of a television receiver, reference may be had to United States reissue patent to Carlson, No. Re. 20,700 granted April 19, 1938. Demodulation and amplification of the television signal together with sync separation may be accomplished in any known way, or as disclosed in an article by A. Wright entitled "Television receiver," published in RCA Review, March 1947 beginning at page 7. Means for sync separation is also shown in United States Patent No. 2,207,775, granted July 16, 1940 to Bedford.

The selected horizontal pulses 25 (that is, the line pulses for providing a control of the rapid motion of the cathode ray beam) are supplied through a coupling capacitor 26 to the grid 31 of a control tube 33. For reasons of simplicity, the vertical input sync pulses are not shown, although in normal present day operation both the vertical and the horizontal or line sync pulses correspond to those proposed and recommended by the industry and by the National Television System Committee and which are found exemplified and shown on pages 22 and 23 of the book entitled "Television Standards and Practice" by Donald G. Fink, published by McGraw-Hill Book Company, Inc., New York, 1943. In this form, the sync signals represent those which have been recommended by the National Television System Committee and its panels. It should be understood, however, that the invention functions properly under the control of any suitable recurring sync pulse, but any illustrations herein given are applied, for simplicity, to the new standarized signal form. A saw-tooth of current 36 produced in the plate circuit of an output tube 38, in a manner to be described in connection with the functioning of a controlled oscillator tube 41, produces a scanning current in the secondary 44 of a transformer 46. A set of horizontal deflection coils 48 surrounds an appropriate part of the tube 22 to produce line deflection of the cathode ray beam in the tube when supplied with current flowing in the secondary 44. The action of the coils 48 in conjunction with the action of a set of vertical (field or frame) deflection coils 52 produce the scanning raster. It will be understood that a damper tube (not shown) is usually provided for a purpose which is by now well known and may, for example, be of the type disclosed in United States patent to Schade, No. 2,309,672 granted February 2, 1943, which shows a damper tube in the plate circuit of a scanning output tube. Damping may also be accomplished in the manner taught in Blumlein Patent Reissue No. 21,400, for example.

A higher voltage for operation of the oscillator tube 41, as well as the control tube 33, may, if desired, be obtained by using the energy recovering arrangement shown in the copending application for United States Letters Patent of Charles E. Torsch, Serial No. 610,368, filed August 11, 1945, now Patent No. 2,477,557 or the arrangement of the present inventor shown in his copending application Serial No. 653,261, filed March 9, 1946 now Patent No. 2,440,418. Where a higher D. C. voltage is available for the plate supply for the tubes 33 and 41, a larger resistance-capacitance combination can be used and a straighter saw-tooth obtained for the same amplitude of saw-tooth voltage which is needed. The arrangements of both the applications just referred to provide an economical means for obtaining the desired higher voltage values, and may, as stated above, be used if desired.

The operating circuits of the oscillator tube 41 are similar to those shown in the copending application of the present inventor for United States patent for Saw-tooth Wave Generators, Serial No. 776,465, filed September 27, 1947, now Patent No. 2,538,541, granted January 16, 1951. For the sake of completeness of disclosure the manner in which the tube 41 functions to produce a saw-tooth wave of voltage will be set forth here.

Figures 2, 3, 4:
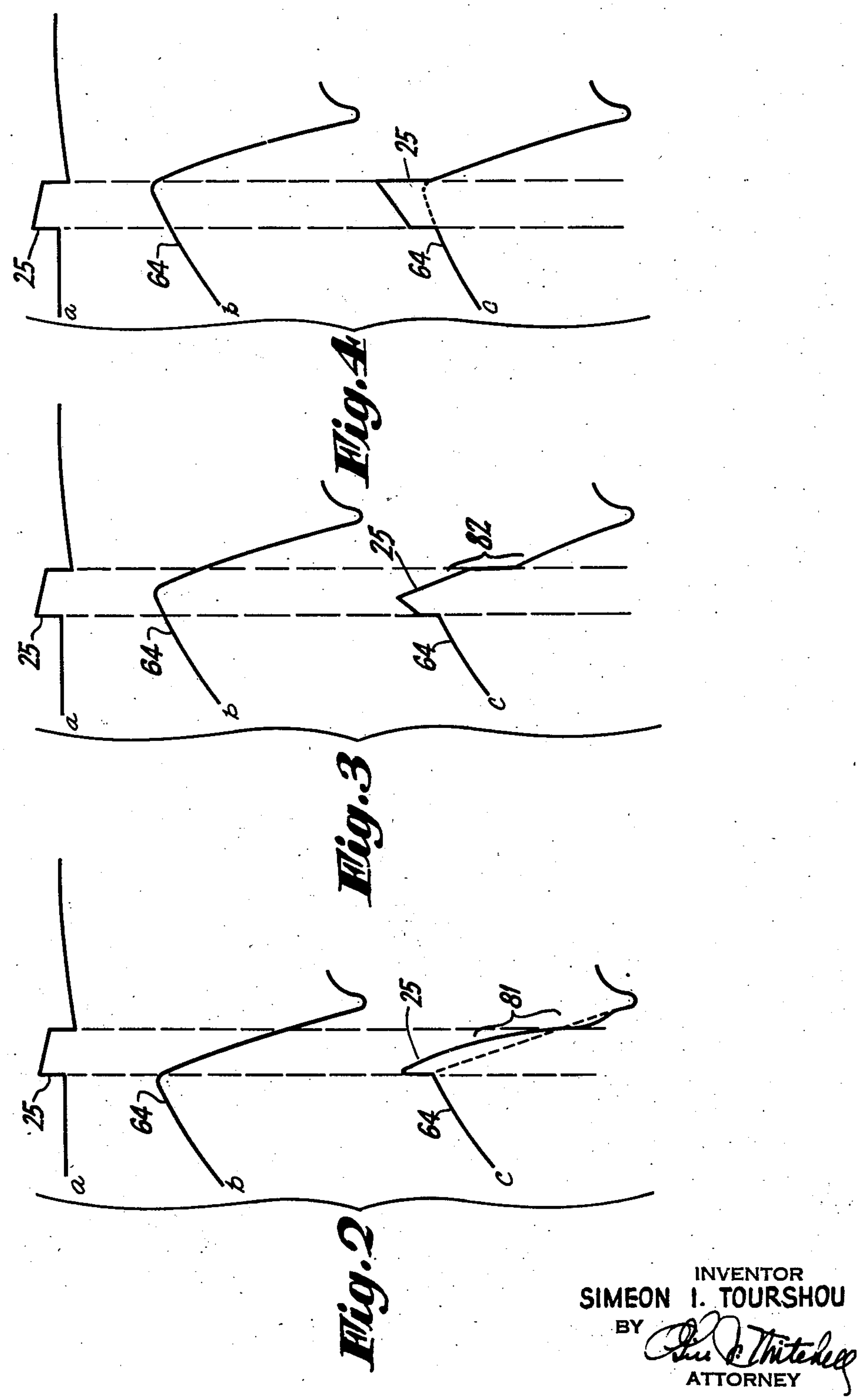
Figures 2, 3 and 4 are representations of assumed signal waves referred to by way of example.

A single coil 54 is provided which may be regarded as an auto-transformer having a primary or grid section 56 and a secondary or plate section 58. The plate section is connected to the anode 61 of the discharge tube 41 and the grid 62 of this tube is connected through a capacitor 63 to the end of the grid section 56. A movable core 55, of powdered iron, for example, may be associated in the flux path of the coil 54 in the manner described in Patent No. 2,538,541 referred to above. The sync pulses 25 are combined with the sawtooth voltage, indicated approximately at 64, as shown by Figs. 2, 3 and 4 in a manner determined by changes in operating conditions. In accordance with the present invention it is the combined wave which controls the oscillator 41.

A capacitor 66 is connected to a suitable source of positive potential (not shown), the voltage output of which may be augmented as suggested above by the voltage booster arrangement shown in the Torsch Patent No. 2,477,557, (supra), through a charging resistor 68. The point of connection to the positive potential source is indicated diagrammatically as a terminal 71. Under certain conditions of operation of the tube 41 the capacitor 66 is charged through the resistor 68. This capacitor is discharged when the tube 41 becomes conductive. A resistor 73 is connected across the plate section 58, or at least a portion thereof, to serve as a damping resistor. During the charge cycles of the capacitor 66 the charging curve is substantially linear, initially. The tube 41 is blocked by a charge on the capacitor 63 which holds the grid 62 negative. This charge on the capacitor 63 leaks off at a controlled rate in a manner to be described until the conduction point of the tube 41 is reached. When the conduction point is reached the grid voltage is raised immediately and increases due to transformer action. Following this, the grid is driven abruptly negative, the negative charge for this purpose being, as indicated, stored in the capacitor 63.

From the operation thus far described it will be seen that the rate of discharge of the capacitor 63 is controllable by a voltage applied at the point in the circuit labelled 106. The control voltage at this point is provided by operation of the control tube 33. This tube 33 has applied to its grid the combined wave-form of voltage of any one of Figures 2, 3 and 4, or the infinite number of intermediate conditions, which may and do, arise in operation of the apparatus of Figure 1. This last statement is also true of the modified arrangement of Figure 5 of the drawings. A coupling capacitance 78 permits the voltage wave 64 of saw-tooth form to appear on the grid 31 of the tube 33 along with the sync pulses 25. This brings about the combining or addition of the saw-tooth wave voltage and the sync pulses 25.

When the oscillator tends to run at a slightly higher than normal frequency the super-position of a sync pulse on a cycle of the saw-tooth wave produces the condition of Figure 2. The curve c in Figures 2, 3 and 4 shows the result of addition of the sync pulse and saw-tooth wave for the given pulse position. Only a small portion of the sync pulse falls on top of the saw-tooth cycle 44, the remainder of the sync pulse appearing as a distortion 81 of the normal saw-tooth wave. With the oscillator tending to run slow a large portion of the sync pulse falls on top of the saw-tooth wave cycle as represented in Figure 4. Conditions of operation are such that the point 106 is to be less positive due to control tube current if the oscillator is fast. This follows from the fact that area under the remaining active portion of the sync pulse, which is on top of the sawtooth, is small and therefore the average current in tube 33 is less. If the oscillator is slow, the point 106 is to be more positive, due to control tube current. The condition of Figure 3 shows a condition of operation between Figures 2 and 4 with the remainder of the sync pulse appearing as a distortion 82. Normal operation of the system, is generally within the range between the conditions shown by Figures 2 and 3 including the conditions of Figures 2 and 3. This may be regarded as the "pull-in" range. The "hold" range for the system lies between the conditions of Figures 2 and 4 including the conditions of Figures 2 and 4.

The anode 83 of the tube 33 is connected to a suitable D. C. source (not shown) at a terminal 71*a* which may be the same source to which the terminal 71 is connected and the source may or may not include the voltage boost feature of the Tourshou Patent No. 2,440,418 or the Torsch Patent No. 2,477,557 (supra). Resistors 84 and 86 serve as control anode bleeder resistors and a capacitor 88 serves as a control anode by-pass. A resistor 91 serves as a cathode degenerator resistor and an additional resistor 92 in the cathode circuit serves as a control voltage resistor. A filter capacitor 94 bridges the resistors 91 and 92 and serves as a cathode filter. The grid 31 is returned to the cathode 96 through a control grid leak resistor 98 and an adjustable frequency control resistor 99 in series with a fixed resistor 101.

Bias for the control tube grid is derived from the oscillator grid which is at a relatively high negative potential with respect to ground. A high resistance 103 supplies bias for the control grid and is connected between the resistor 98 and the resistors 101 and 99, the value of bias being determined by the relative values of the resistor 103 and the resistors 101 and 99.

In operation of the system of Figure 1, when the oscillator is slow the condition of Figure 4 holds and a larger portion of the sync pulses having a relatively high energy content is applied to the grid 31 to raise it in the positive direction. This causes an increase in plate current and makes the point 106 more positive. A resistor 108, which serves as the oscillator grid leak, provides a discharge path for the capacitor 63 and is connected to the point 106 whereby there is an increased rate of discharge of the capacitor 63.

When the oscillator is running fast, the condition of Figure 2 holds and the grid 31 is less positive causing a diminished flow of plate current. The point 106, therefore, is less positive than under the condition described above in connection with Figure 4 and discharge of the condenser 63 is more delayed.

Degeneration of noise interference of relatively short duration and also of the vertical sync pulses is provided by the cathode degenerator resistor 91 and a control delay capacitor 112. The capacitor 112 tends to hold the grid bias temporarily steady upon occurrence of a noise pulse. Therefore increase in the tube current tends to change the potential of the cathode only, without an accompanying change in the potential of the grid. The advantage of this feature is that, whereas a filter modifies an impulse from a high amplitude short duration form to low amplitude long duration form, degeneration actually reduces the amount of energy developed by the impulse. Since the phase of the controlled source of frequency is an integral function of frequency deviation, a filter circuit which reduces and delays the effect of the noise impulse, allows the phase deviation to build up. This in turn requires excessive restoring action and the whole process appears like a tendency to hunt or oscillate. Degeneration cures the trouble at its source by holding back the energy of the short impulse of noise rather than by modifying its shape.

Figure 5 of the drawings shows a preferred modification of a beam deflection control system embodying the invention.

Inasmuch as the general arrangement of a number of the apparatus components, for example the oscillator 41 and the control tube 33 are similarly arranged in Figure 5 of the drawings, like reference characters for similar parts, will be used with the added suffix "*a*." These two tubes are, therefore, respectively designated 41*a* and 33*a*. As in Figure 1 the capacitor 66*a* is charged through the resistor 68*a* to produce a sawtooth of voltage. A connection shown schematically at 116 is available for connection to the deflection circuits of a cathode ray tube such, for example, as the tube 22 of Figure 1. The sawtooth voltage 64*a* produced by the controlled oscillator 41*a* is changed to a parabolic wave form, or approximately a parabolic wave form, by a resistor 121 and a capacitor 123. This parabolic wave 119 is applied by a coupling capacitor 126 to the grid 31*a* of the control tube 33*a*. The separated sync signal comprising the pulses 25*a* is applied through a capacitor 128 to the grid coupling capacitor 126. These pulses are attenuated to the form *f* (Figures 6 and 7) by capacitors 128, 123 and a variable capacitor 163. Voltage pulses 131, which are produced in the secondary 44*a* of the deflection transformer 46*a* are modified by an R-C (resistance-capacitance) combination 133 and 134 to the form 135 and are also applied to the grid coupling capacitor 128. The resulting wave form is shown by curve *g* of the Figures 6 and 7 of the drawings for different assumed phase positions. Waves *c*, *d* and *f* are added as suggested by Figures 6 and 7 to produce the repeated wave *g*.

On the "gating" part of the cycle of the series of combined waves *g*, the tube 33*a* is caused to conduct. Assuming the relative phase relationship in Figure 6 of the sync pulse 25, or the pulse *f* derived therefrom and the wave *e* derived in accordance with this aspect of the invention, there is a minimum average plate current flowing in the tube 33*a*. In this condition the pulse width of the effective pulse 142, which is the upper part of the curve *g* of Figure 6 of the drawings above the cutoff of the tube 33*a*, is small. The control point 146, which corresponds in some respects to the control point 106 of Figure 1 is less positive in voltage with respect to a common reference such as ground due to the minimum plate current flowing in the tube 33*a*. Resistors 151 and 152 have substantially the same function in the arrangement of Figure 5 as do the resistors 91 and 92, respectively, of Figure 1. If the capacitance value of a variable capacitor 156 is increased, the frequency of the oscillator 41*a* will decrease. A sawtooth of voltage appears across the capacitor 156 in operation of the system. The amount and shape of the A. C. voltage at the point 146 is varied with the change and adjustment with the capacitor 156. Since this voltage is in series with the grid leak 158 of the oscillator tube 41*a*, it can readily be seen that the oscillator frequency will be caused to change. The direction of such change with an increase in capacitance value of the capacitor 156 is indicated immediately above. A resistor 159 has the same function as the resistor 103 of Figure 1.

Figure 6:
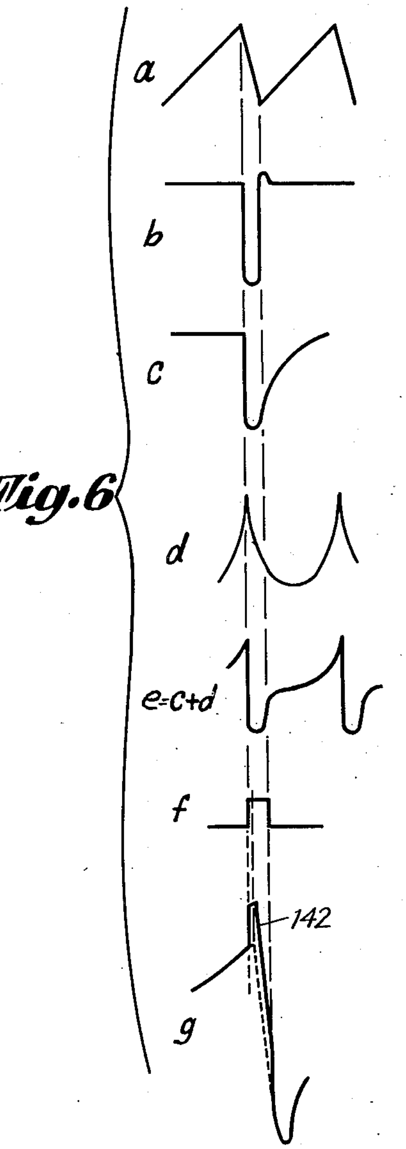
Figures 6 and 7 represent assumed signal wave forms referred to in explaining the operation of the apparatus of Figure 5.
Figure 7:
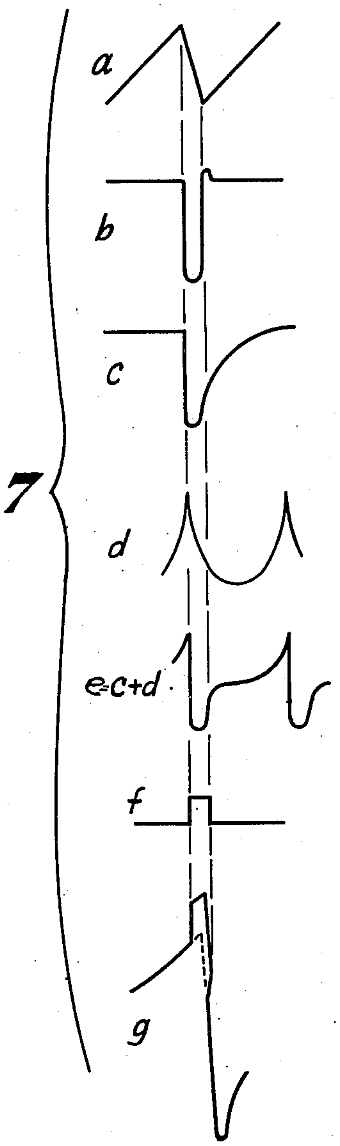

An adjustable resistor 161 varies the cut-off point of the tube 33*a*, which has the effect of varying the "gating" effect of this tube upon the series of waves *f* of Figure 6. With the adjustable resistor 161 set to an increased value, it causes the frequency of the oscillator 54*a* to increase.

The previously mentioned variable capacitor 163 varies, or may be used to vary, the amplitude of the combined wave form such, for example, as the wave form *f* of Figure 6, applied to the grid 31*a* of the tube 33*a*.

A resistor 166 eliminates the tendency of the system to hunt. If this resistor 166 were not present, then the time constant would consist of resistor 152, plus resistor 151 shunted by a capacitor 169, plus the capacitance of the capacitor 171. The capacitance of the capacitor 171 is large and, therefore, the time constant is large. It, therefore, takes a relatively long time for the voltage across the cathode of the tube 33*a* to build up to any new value required by the changing speed, either of the signal or the oscillator 41*a*. Thus the tube 33*a* would not be fast enough in its correcting action if the resistor 166 were omitted. With this resistor 166 located in the system as shown, the total time constant is reduced.

An adjustable capacitor 174 provides an inexpensive form of adjustment for the amplitude of the sawtooth wave fed to the grid of a deflection output tube 176.

What I claim is:

1. In a television system, deflection means operative to produce voltage pulses following each deflection operation, means for partially integrating and attenuating said pulses, a source of sync signals, said sync signals being in the form of pulses, a source of voltage of sawtooth wave form, means for converting said sawtooth voltage wave to parabolic waveform, means to combine said sync signals, said partially integrated and attenuated pulses, and said parabolic wave directly, means responsive to said combining means for producing a control voltage, an oscillator for controlling operation of said deflection means, and means to apply said control voltage to said oscillator.

2. In a television system, an oscillator, means producing a peaked wave in which the total potential change in one polarity direction extends over a considerably greater period of time than the corresponding total potential change in the opposite polarity direction, a source of sync signals, said sync signals being in the form of pulses, means for combining said peaked wave and said sync signal pulses in such a phase relationship that the sync signal pulses coincide with the peaks of said peaked wave during desired operation of the system, means for developing an output voltage in accordance with phase changes of said sync signal pulses with respect to the peaks of said peaked wave, means for automatically controlling the frequency of said oscillator in response to said output voltage to maintain said desired operation of said system, and means for adjusting the operation of said output voltage developing means in a manner to control the free-running frequency of said oscillator.

3. In a television system, an oscillator, means producing a peaked wave in which the total potential change in one polarity direction extends over a considerably greater period of time than the corresponding total potential change in the opposite polarity direction, a source of sync signals, said sync signals being in the form of pulses, means for combining said peaked wave and said sync signal pulses in such a phase relationship that the sync signal pulses coincide with the peaks of said peaked wave during desired operation of the system, means comprising a discharge tube for developing an output voltage in accordance with phase changes of said sync signal pulses with respect to the peaks of said peaked wave, means for automatically controlling the frequency of said oscillator in response to said output voltage to maintain said desired operation of said system, and an adjustable resistor included in a circuit of said discharge tube for adjusting the operation of said discharge tube thereby to change the free-running frequency of said oscillator.

4. A deflecting circuit having an oscillator therein, means for producing a peaked voltage wave of asymmetrical parabolic form having in the region of each peak one slope steeper than the other and also having a definite time relationship with respect to the frequency of said oscillator, means for superimposing received sync pulses upon recurring peaks of said asymmetrical parabolic peaked voltage wave during desired operation of said deflecting circuit, means for producing a frequency control voltage having a value which changes in response to a change in the relative phase positions of said sync pulses and the recurring peaks of said asymmetrical parabolic peaked voltage wave, and means for controlling the frequency of said oscillator in accordance with said control voltage to maintain said desired operation of said deflecting circuit.

5. A deflecting circuit having an oscillator therein, means for producing a peaked voltage wave of asymmetrical parabolic form having a slope on one side of each peak which is steeper than the slope on the other side of each peak and also having a definite time relationship with respect to the frequency of said oscillator, means for superimposing received sync pulses upon recurring peaks of said asymmetrical parabolic peaked voltage wave during desired operation of said deflecting circuit, means comprising a vacuum tube for producing a frequency control voltage having a value which changes in response to a change in the relative phase positions of said sync pulses and the recurring peaks of said asymmetrical parabolic peaked voltage wave, and means for controlling the frequency of said oscillator in accordance with said control voltage to maintain said desired operation of said deflecting circuit.

6. In a television system, a source of sync signals, a sawtooth voltage wave source, means to convert said sawtooth wave to a peaked wave having an asymmetrical parabolic form in which the slopes on either side of each of the peaks are of different steepness, a vacuum tube in which said sync signals and said asymmetrical parabolic voltage wave are combined in such a manner that said sync signals and the peaks of said asymmetrical parabolic voltage wave occur substantially simultaneously in normal operation of said system to produce a combined signal, means to render said tube responsive to said combined signal, means for producing a unidirectional control voltage from the output of said vacuum tube in accordance with the phase relationship of said sync signals and said asymmetrical parabolic voltage wave, and means for impressing said control voltage upon said sawtooth wave source to control the frequency of said sawtooth wave so as to maintain said normal operation of said system.

7. In a television system, means including a condenser across which is developed a recurrent peaked wave in which the total potential change in one polarity direction extends over a considerably greater period of time than the corresponding total potential change in the opposite polarity direction, a source of sync signals of a similar recurrent rate, said sync signals being in the form of pulses, means to combine said sync signals and said peaked wave in such a normal phase relationship of said sync signals with respect to said peaked wave that said sync signals and the peaks of said peaked wave occur simultaneously, a vacuum tube responsive to a portion of the combined peaked wave and sync signals, an output circuit for said vacuum tube, means to obtain a control voltage from said output circuit, an oscillator for controlling the rate at which said recurrent peaked wave is developed, means for deriving a negative operating bias for said vacuum tube from said oscillator, and means to apply said control voltage to said oscillator to maintain said normal phase relationship.

8. In a television system, means comprising a resistor, a condenser and a positive potential source for producing a voltage of sawtooth wave form, a source of sync signals, said sync signals being in the form of pulses, means to combine said sync signals and said sawtooth wave form whereby the normal phase relationship of said sync signals with respect to sawtooth waveform is such that their peaks occur simultaneously, a vacuum tube responsive to a portion of the sawtooth and a portion of the combined sync signal, said vacuum tube having a cathode circuit, means in said cathode circuit for producing a control voltage, an oscillator for controlling the operation of said first named means, means for deriving a negative operating bias for said vacuum tube from said oscillator, means to apply said control voltage to said oscillator to maintain said normal phase relationship, said cathode circuit including a resistance-capacitance combination having a fast response thereby to integrate pulses of current in said cathode circuit, said cathode circuit also including a resistance capacitance combination having a relatively slow response to maintain control over longer periods of time and to filter out disturbances of relatively long time duration.

9. In a television system, means comprising a resistor, a condenser and a positive potential source for producing a peaked wave in which the total potential change in one polarity direction extends over a considerably greater period of time than the corresponding total potential change in the opposite polarity direction, a source of sync signals, said sync signals being in the form of pulses, means to combine said sync signals and said peaked wave in such a normal phase relationship of said sync signals with respect to said peaked wave that said sync signals and the peaks of said peaked wave occur simultaneously, vacuum tube means responsive to a portion of the combined peaked wave and sync signals, means including said vacuum tube for producing a control voltage, an oscillator for controlling the operation of said peaked wave producing means, and means to apply said control voltage to said oscillator to maintain said normal phase relationship.

10. In a television system, means comprising a resistor, a condenser and a positive potential source for producing a peaked wave in which the total potential change in one polarity direction extends over a considerably greater period of time than the corresponding total potential change in the opposite polarity direction, a source of sync signals, said sync signals being in the form of pulses, means to combine said sync signals and said peaked wave in such a normal phase relationship of said sync signals with respect to said peaked wave that said sync signals and the peaks of said peaked wave occur simultaneously, vacuum tube means responsive to peaked portions of said combined peaked wave and sync signals for producing a control voltage, an oscillator for controlling the operation of said peaked wave producing means, means for deriving a negative operating bias for said vacuum tube from said oscillator, and means to apply said control voltage to said oscillator to maintain said normal phase relationship.

11. In a television system, means comprising a resistor, a condenser and a positive potential source for producing a peaked wave in which the total potential change in one polarity direction extends over a considerably greater period of time than the corresponding total potential change in the opposite polarity direction, a source of sync signals, said sync signals being in the form of pulses, means to combine said sync signals and said peaked wave in such a normal phase relationship of said sync signals with respect to said peaked wave that said sync signals and the peaks of said peaked wave occur simultaneously, vacuum tube means responsive to a portion of the combined peaked wave and sync signals; means including said vacuum tube for producing a control voltage; an oscillator for controlling the operation of said peaked wave producing means; means for deriving a negative operating bias for said vacuum tube from said oscillator; and means to apply said control voltage to said oscillator to maintain said normal phase relationship.

12. In a television system, a device including an oscillator, the rate of which is controllable, for producing a voltage output of sawtooth wave form, means for converting said sawtooth voltage to parabolic wave form, means for providing a series of pulses of a repetition rate identical with the frequency of said sawtooth waveform, means for combining said parabolic waveform and said pulses for providing an undulating voltage wave form in which the total potential change in one polarity direction extends over a considerably greater period of time than the corresponding total potential change in the opposite polarity direction, a source of sync signal pulses, means to combine said undulating voltage wave form with the sync signal pulses in such a phase relationship that the sync signal pulses normally coincide with a polarity change of the undulating voltage wave, means responsive to that portion of the sync signal pulses that overlaps that part of the undulating voltage wave form having a potential change in the said one polarity direction for producing a control voltage, and means to apply the control voltage to said oscillator to maintain successive sync signal pulses in the said normal phase relationship with respect to the voltage output wave.

13. In a television system, a device including an oscillator, the rate of which is controllable, for producing a voltage output wave form in which the total potential change in one polarity direction extends over a considerably greater period of time than the corresponding total potential change in the opposite polarity direction, said oscillator comprising a first space discharge tube having at least a control grid, a grid condenser connected to said oscillator control grid, a source of sync signal pulses, means to combine the voltage output wave form with the sync signal pulses in such a phase relationship that the sync signal pulses normally coincide with a polarity change of the voltage output wave, a second space discharge tube having a cathode, an anode and a control grid, a biasing resistor connected from said control grid of said first named space discharge tube to said control grid of said second named space discharge tube to bias said second named tube to be responsive to that portion of the sync signal pulses that overlaps that part of the voltage output wave form having a potential change in the said one polarity direction, a cathode resistor in the cathode circuit of said second named tube, a capacitor shunting said resistor, said tube in operation producing a control voltage across said cathode resistor, and means to apply the control voltage to the grid of said oscillator tube to maintain successive sync signal pulses in the said normal phase relationship with respect to the voltage output wave.

SIMEON I. TOURSHOU.

REFERENCES CITED

The following references are of record in the file of this patent:

UNITED STATES PATENTS

| Number | Name | Date |
|---|---|---|
| 2,201,978 | Bedford | May 28, 1940 |
| 2,209,507 | Campbell | July 30, 1940 |
| 2,277,000 | Bingley | Mar. 17, 1942 |
| 2,339,536 | Wendt | Jan. 18, 1944 |
| 2,344,810 | Fredendall et al. | Mar. 21, 1944 |
| 2,391,776 | Fredendall | Dec. 25, 1945 |
| 2,458,156 | Fredendall et al. | Jan. 4, 1949 |
| 2,459,699 | Hallmark | Jan. 18, 1949 |
| 2,503,700 | Barco | Apr. 11, 1950 |
| 2,507,317 | Moore | May 9, 1950 |